(12) United States Patent
Matsushita et al.

(10) Patent No.: US 6,777,453 B1
(45) Date of Patent: Aug. 17, 2004

(54) METHOD OF RECLAIMING CROSSLINKED RUBBER, AND MOLDED ARTICLE OF RECLAIMED RUBBER

(75) Inventors: Mitsumasa Matsushita, Aichi-ken (JP); Makoto Mouri, Aichi-ken (JP); Hirotaka Okamoto, Aichi-ken (JP); Kenzo Fukumori, Aichi-ken (JP); Norio Sato, Aichi-ken (JP); Toru Yoshida, Aichi-ken (JP); Masahito Fukuta, Aichi-ken (JP); Hidenobu Honda, Aichi-ken (JP); Katsumi Nakashima, Aichi-ken (JP); Tamotsu Watanabe, Aichi-ken (JP); Yasuyuki Suzuki, Toyota (JP); Masao Owaki, Toyota (JP)

(73) Assignees: Kabushiki Kaisha Toyota Chuo Kenyusho, Aichi-gun (JP); Toyoda Gosei Co., Ltd., Nishikasugai-gun (JP); Toyota Jidosha Kabushiki Kaisha, Toyota (JP)

( * ) Notice: Subject to any disclaimer, the term of this patent is extended or adjusted under 35 U.S.C. 154(b) by 166 days.

(21) Appl. No.: 10/009,179
(22) PCT Filed: Jun. 7, 2000
(86) PCT No.: PCT/JP00/03712
§ 371 (c)(1),
(2), (4) Date: May 3, 2002
(87) PCT Pub. No.: WO00/74913
PCT Pub. Date: Dec. 14, 2000

(30) Foreign Application Priority Data
Jun. 8, 1999 (JP) .......................................... 11/161079

(51) Int. Cl.[7] .............................................. C08J 11/04
(52) U.S. Cl. ............................ 521/45; 521/41; 521/45.5
(58) Field of Search .......................... 521/40, 40.5, 45, 521/45.5, 44

(56) References Cited

U.S. PATENT DOCUMENTS

| 5,811,036 A | 9/1998 | Takahashi et al. |
| 6,133,413 A | 10/2000 | Mouri et al. |
| 6,133,416 A | * 10/2000 | Wilson et al. .............. 530/300 |
| 6,632,918 B1 | * 10/2003 | Matsushita et al. ......... 528/481 |

FOREIGN PATENT DOCUMENTS

| JP | 5-133514 | | 5/1993 |
| JP | 6-210633 | | 8/1994 |
| JP | 06-210633 | * | 8/1994 |
| JP | 7-227846 | | 8/1995 |
| JP | 10-287765 | * | 10/1998 |
| JP | 10-310662 | | 11/1998 |
| JP | 11-140222 | | 5/1999 |

* cited by examiner

Primary Examiner—Katarzyna Wyrozebski
(74) Attorney, Agent, or Firm—Oblon, Spivak, McClelland, Maier, & Neustadt, P.C.

(57) ABSTRACT

The object of the present invention is to provide a method of reclaiming crosslinked rubber wherein a reduction of qualities due to generation of decomposed products hardly occurs, and a molding of reclaimed rubber.

In a reclamation step of reclaiming crosslinked rubber 10 by applying shear stress thereto and/or in a subsequent step in the present invention, a degasification carrier is introduced and decomposed products in the crosslinked rubber 10 are removed together with the degasification carrier. Also the disclosed is a molding of reclaimed rubber prepared by re-crosslinking reclaimed rubber obtained by this method.

18 Claims, 6 Drawing Sheets

METHOD OF RECLAIMING CROSSLINKED RUBBER, AND MOLDED ARTICLE OF RECLAIMED RUBBER

This application is a 371 of PCT/JP00/03712.

TECHNICAL FIELD

The present invention relates to a method of reclaiming crosslinked rubber and to a molding of reclaimed rubber.

BACKGROUND ART

Heretofore, there has been known a reclaiming method wherein wastes of rubber moldings such as tire wastes etc., or scrap, defective moldings, etc. occurring in a process for producing rubber moldings, are converted into reclaimed rubber by applying heat and shear stress thereto.

According to the above reclaiming method, crosslinkages among rubber molecules constituting crosslinked rubber are cleaved by heat and shear stress, thus providing reclaimed rubber in a state similar to non-crosslinked rubber.

By re-crosslinking such reclaimed rubber singly and/or re-crosslinking a mixture which is formed by mixing new non-crosslinked rubber and the reclaimed rubber, moldings of the reclaimed rubber is formed, thus enabling recycling of crosslinked rubber.

A certain kind of crosslinked rubber generates decomposed products during reclamation, and a deterioration in qualities etc. may occur owing to the decomposed products. In the conventional reclaiming method, it was difficult to deal with the problem caused by the decomposed products.

Specifically, a certain kind of crosslinked rubber generates a malodorous gas during reclamation. To reclaim such crosslinked rubber, (1) the malodorous gas is subjected to combustion and deodorization in a combustion-type deodorizing unit and is released to the atmosphere as shown in JP-A 6-210633, and (2) malodorous components in the malodorous gas and in reclaimed rubber are continuously removed by heating in a heating oven as shown in JP-A 9-308951.

In the method (1), the malodorous gas could be removed from the gas released to the atmosphere during reclamation, but the malodorous gas remaining in the reclaimed rubber could not be removed. Accordingly, there was a problem that a bad smell is generated upon re-crosslinking of the reclaimed rubber or genrated from moldings of the re-crosslinked reclaimed rubber.

Removal of the malodorous gas by the method (2) is also unsatisfactory, and it was difficult in some cases to obtain reclaimed rubber applicable to articles used particularly in a closed space (e.g. in a room). Further, use of a heating oven made it difficult to apply the method to crosslinked rubber easily denatured by heating.

In a certain kind of crosslinked rubber in an embodiment different from the above, its decomposed products produced during reclamation react again with the crosslinked rubber in the process of reclamation to cause a deterioration in the qualities of reclaimed rubber. Further, the decomposed products can be a cause for premature crosslinkage to deteriorate scorch characteristics and storage stability.

The present invention was made in view of such conventional problems, and the object of the present invention is to provide a method of reclaiming crosslinked rubber wherein a reduction of qualities due to generation of decomposed products hardly occurs, and a molding of reclaimed rubber.

DISCLOSURE OF INVENTION

The present invention relates to a method of reclaiming crosslinked rubber, which includes introducing a degasification carrier and removing, together with the degasification carrier, decomposed products in crosslinked rubber, during a reclamation step of reclaiming crosslinked rubber by applying shear stress thereto and/or a subsequent step after the reclamation step.

The most remarkable feature of the present invention lies in removal of decomposed products together with the introduced degasification carrier.

According to this feature, the decomposed products are removed, thus scarcely remaining in crosslinked rubber in the process of reclamation and in reclaimed rubber. Accordingly, the deterioration in qualities of reclaimed rubber by the decomposed products and the inhibition of reclamation of crosslinked rubber by the decomposed products can be prevented.

According to the present invention, as described above, there can be provided a method of reclaiming crosslinked rubber wherein a reduction in qualities due to generation of decomposed products hardly occurs.

The process for introducing the degasification carrier and for removing decomposed products together with the degasification carrier is carried out preferably during reclamation of crosslinked rubber (see Embodiment 6). With this arrangement, the effect of the present invention can be secured.

As described later, cleavage of crosslinkages in crosslinked rubber is initiated by applying shear stress thereto, and almost simultaneously with the cleavage of crosslinkages, the decomposed products are also generated. Therefore, the effect of the present invention cannot be obtained if introduction and removal of the degasification carrier (degasification treatment) is conducted before decomposed products are generated, that is, before the cleavage of crosslinkages in crosslinked rubber is initiated. Accordingly, the degasification treatment should be carried out after a plasticizing step and/or a kneading step, which are described later. The degasification treatment may be repeated.

The decomposed products include e.g. malodorous components.

A certain kind of crosslinked rubber generates a malodorous gas during reclamation. As described above, it was difficult to remove the malodorous gas from such crosslinked rubber by the conventional method. The reclaiming method of the present invention can be applied to remove the malodorous components thereby improving the working environment during reclamation or during re-crosslinking of reclaimed rubber in forming moldings of reclaimed rubber (by rolling refining etc.)

Further, when the reclaimed rubber is formed into moldings of reclaimed rubber, the bad smell of the moldings of reclaimed rubber can be reduced, and thus the value of the moldings can be increased.

Further, the ratio of reclaimed rubber in moldings of the reclaimed rubber can be increased to improve the efficiency of recycling.

In addition, the processability of reclaimed rubber can be raised to improve crosslinking characteristics. Furthermore, the physical characteristics of reclaimed rubber moldings obtained from the reclaimed rubber can also be improved. Moreover, reclamation itself can also be promoted.

The crosslinked rubber generating malodorous gas as described above includes sulfur-vulcanized EPDM (ethylene propylene diene terpolymer), NR/SBR (blended rubber of natural rubber and styrene-butadiene rubber), SBR (styrene-butadiene rubber), NBR (acrylonitrile-butadiene rubber) etc.

When the crosslinked rubber generating a malodorous gas as described above is reclaimed, a deodorant may be added thereto. The malodorous gas can thereby be further reduced. The deodorant in this case can make use of perfumes such as vanillin and lignin and deodorants such as activated carbon and sepiolite.

Besides, rubbers such as acryl rubber generating amine compounds as decomposed products can be reclaimed by the production method of the present invention.

The amount of the degasification carrier added is preferably 0.02 to 20 parts by weight based on 100 parts by weight of crosslinked rubber. Decomposed products can thereby certainly removed. If the amount of the degasification carrier is less than 0.02 parts by weight, the effect is hardly obtained, while if the amount exceeds 20 parts by weight, the amount of the degasification carrier volatilized can be increased to make stable reclamation of crosslinked rubber difficult and to make removal of the degasification carrier incomplete, thus permitting a large amount of the degasification carrier to remain in the reclaimed rubber. The lower limit of the degasification carrier is preferably 0.1 part by weight, more preferably 0.5 part by weight. The upper limit thereof is preferably 7 parts by weight.

In the step of removing decomposed products together with the degasification carrier, techniques selected from heating degasification, degasification under reduced pressure, solvent cleaning, and bubbling are preferably used alone or in combination thereof.

The heating degasification is a method of removing decomposed products by gasification; the degasification under reduced pressure is a method of removing decomposed products by promoting gasification thereof under reduced pressure; the solvent cleaning is a method of removing decomposed products by dissolution; and the bubbling is a method of promoting removal of decomposed products by increasing the gasification area of decomposed products.

The degasification under reduced pressure is conducted preferably by using a low-boiling compound as the degasification carrier in order to remove decomposed products together with the degasification carrier. With this arrangement, gasification of the low-boiling compound and decomposed products, particularly malodorous component, can be promoted under reduced pressure to realize efficient removal of the decomposed products.

Particularly when the decomposed products are malodorous components, it is preferable that by treatment with the degasification carrier, the decomposed products are reduced to ½ or less relative to those before introduction of the degasification carrier. The decomposed products are reduced more preferably to ⅓ or less, most preferably ¹⁄₁₀ or less.

With this arrangement, it is possible to improve the working environment under which the reclaimed rubber is formed into e.g. moldings of reclaimed rubber. Further, when the reclaimed rubber is formed into the moldings of reclaimed rubber described below, the bad smell of the moldings of reclaimed rubber can be reduced, whereby the value of the moldings can be increased.

Particularly when the malodorous components are sulfur compounds or nitrogen compounds, it is preferable that they are reduced by degasification to ⅓ or less relative to those before introduction of the degasification carrier. They are reduced more preferably to ¹⁄₂₀ or less by degasification.

The reclamation step of reclaiming the crosslinked rubber by applying shear stress thereto and the step of removing the decomposed products with the degasification carrier are conducted preferably successively. With this arrangement, efficient reclamation of the crosslinked rubber can be realized.

Now, the reclamation step of reclaiming the crosslinked rubber by applying shear stress thereto is described.

This reclamation step consists of a preheating step, a plasticizing step and a kneading step. The preheating step is a step in which the crosslinked rubber is heated to a temperature at which the crosslinkages therein can be cleaved. The plasticizing step is a step in which cleavage of the crosslinkages in the crosslinked rubber is initiated thereby initiating softening of the crosslinked rubber. The kneading step is a step in which the crosslinkages are cleaved and the rubber molecules are dispersed and mixed.

The shear stress in the plasticizing step is preferably 1 to 100 MPa. With this arrangement, reclamation of crosslinked rubber can be certainly effected. When the shear stress is less than 1 MPa, the shear stress is too small to effect promotion of cleavage of crosslinkages and thus the efficiency of reclamation may be lowered. On the other hand, when the shear stress is larger than 100 MPa, the shear stress permits progress of not only cleavage of crosslinkages but also cleavage of main chains of rubber molecules, and thus the physical properties of reclaimed rubber may be deteriorated. The upper limit of the shear stress in the plasticizing step is more preferably 15 MPa.

The reclamation step is conducted preferably at the temperature of 100 to 520° C. With this arrangement, the crosslinkages are cleaved while cleavage of the main chains is suppressed.

In the plasticizing step, the temperature of the crosslinked rubber is preferably 100 to 520° C. With this arrangement, reclamation of the crosslinked rubber can be certainly effected. When the temperature of the crosslinked rubber is lower than 100° C., cleavage of the crosslinkages may not sufficiently proceed. On the other hand, when the temperature is higher than 520° C., cleavage of the main chains proceeds, and thus the physical properties of the reclaimed rubber may be deteriorated. The upper limit of the temperature of the crosslinked rubber is more preferably 450° C.

In the reclamation step, the crosslinked rubber is heated or cooled as necessary so as to be in the above temperature range. When the heat evolved by the crosslinked rubber upon shearing is too low, the rubber is heated; and when the heat is too high, the rubber is cooled. If the above temperature range is attained by the heat of the crosslinked rubber upon shearing, heat transfer (heating or cooling) from the outside is not necessary.

The optimum temperature range is varied depending on the type of crosslinked rubber. For example, when automobile tires etc. are to be reclaimed, the temperature range is preferably 80 to 360° C. When peroxide-crosslinked rubbers such as EPDM are to be reclaimed, the temperature range is preferably 220 to 450° C.

The upper limit of the temperature range during reclamation is varied depending on the duration of reclamation, and the temperature should be raised for shorter reclamation.

The step of reclaiming the crosslinked rubber is conducted preferably by use of an extruder. With this arrangement, reclamation of the crosslinked rubber can be successively effected to realize efficient reclamation.

By use of an extruder, degasification can be performed in the extruder, and the frequency of contact between the degasification carrier and the crosslinked rubber or reclaimed rubber can be raised, thus enabling efficient reclamation and degasification.

When the crosslinked rubber is resin-crosslinked butyl rubber, the present invention is preferably used.

When the resin-crosslinked butyl rubber is reclaimed by the conventional method, decomposed products consisting of phenol resin etc. occur and react again with resin-crosslinked butyl rubber in the process of reclamation, and thus the resultant reclaimed rubber is poor in qualities.

The deterioration in qualities of the reclaimed rubber, caused by re-reaction of the decomposed products with resin-crosslinked butyl rubber in the process of reclamation, can be prevented by the reclaiming method of the present invention. Further, a deterioration in the scorch characteristics and storage stabilities of the reclaimed rubber can also be prevented.

The degasification carrier is preferably at least one selected from a group including inert gas, water and alcohol. The effect of the present invention can thereby be secured.

Particularly, water can be used to achieve the effect of promoting decomposition of crosslinked rubber by water and of hydrolyzing the decomposed products into harmless ones. Further, the cleaning effect of water, the increase of the gasification area due to the bubbling effect of gasification, and the effect of water vapor as a carrier gas can be obtained, and thus the decomposed products can be efficiently removed. Further, water is inexpensive, thus reducing costs.

The inert gas includes $N_2$, Ar, He, $CO_2$ etc.

The present invention also relates to a molding of reclaimed rubber produced by a process including introducing a degasification carrier and removing, together with the degasification carrier, decomposed products in crosslinked rubber to obtain reclaimed rubber during a reclamation step of reclaiming crosslinked rubber by applying shear stress thereto and/or a subsequent step after the reclamation step, and re-crosslinking the reclaimed rubber or melt-blending the reclaimed rubber with thermoplastic resin.

By removing the decomposed products together with the introduced degasification carrier, the decomposed products are removed thus scarcely remaining in crosslinked rubber in the process of reclamation and in reclaimed rubber. Accordingly, the deterioration in qualities of reclaimed rubber by the decomposed products is prevented, and as a consequence, the deterioration in qualities of moldings of reclaimed rubber produced by re-crosslinking the reclaimed rubber or by melt-blending the reclaimed rubber with thermoplastic resin can be prevented.

Other detailed features are similar to those described above.

According to the present invention, there can be provided moldings of reclaimed rubber wherein deterioration of qualities due to generation of decomposed products hardly occurs, as described above.

When the crosslinked rubber is resin-crosslinked butyl rubber, the present invention is preferably used.

In reclamation of resin-crosslinked butyl rubber, the deterioration in qualities of the resultant reclaimed rubber, caused by re-reaction of decomposed products such as phenol resin with resin-crosslinked butyl rubber in the process of reclamation, can be prevented according to the present invention. Further, a deterioration in the scorch characteristics and storage stability of the reclaimed rubber can also be prevented. Accordingly, moldings of reclaimed rubber excellent in storage stability and superior in molding-workability can be obtained.

The amount of decomposed products in the reclaimed rubber is reduced preferably to ½ or less relative to that before introduction of the degasification carrier. The deterioration in qualities by the decomposed products can there by be prevented.

BEST MODE FOR CARRYING OUT THE INVENTION

Embodiment 1

The method of reclaiming crosslinked rubber according to the embodiments of the present invention is described by reference to FIG. 1.

In this embodiment, a degasification carrier is introduced and, together with the degasification carrier, decomposed products in crosslinked rubber are removed in a step of reclaiming crosslinked rubber by applying heat and shear stress thereto.

In this embodiment, reclamation of crosslinked rubber is conducted by means of a twin-screw extruder shown below.

Figure 1:
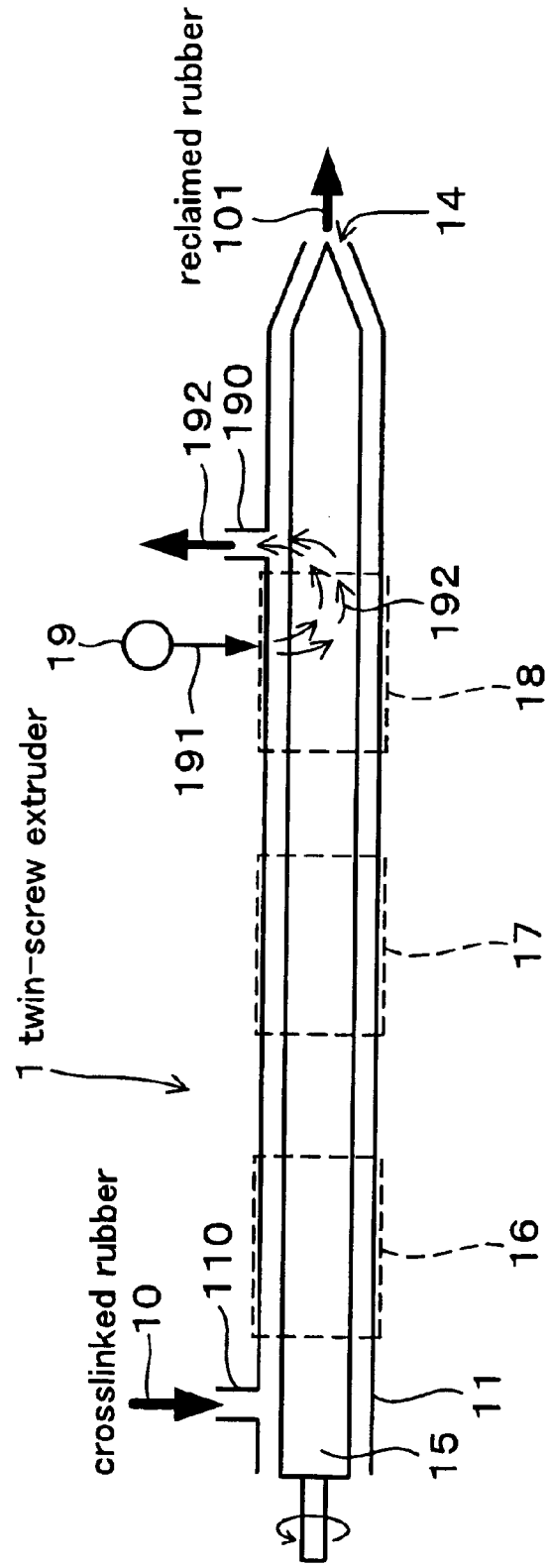
FIG. 1 shows the structure of a twin-screw extruder used in reclamation of crosslinked rubber in Embodiment 1.

As shown in FIG. 1, the twin-screw extruder 1 is provided with a cylinder 11 having a screw 15 therein, an inlet 110 for feeding crosslinked rubber 10 into the cylinder 11, and an extrusion orifice 14 for discharging reclaimed rubber 101.

The cylinder 11 is provided with a pump 19 thereon and a degasification vent 190 between the pump 19 and extrusion orifice 14. A degasification carrier is introduced by the pump 19 into a kneading zone 18 describe later.

Water 191 is used as the degasification carrier in this embodiment, and water vapor 192 gasified in the kneading zone 18, together with decomposed products, is discharged through the degasification vent 190 into the outside of the cylinder.

The crosslinked rubber 10 is heated by a heater, which is not shown, arranged outside of the twin-screw extruder 1, and shear stress is applied to the crosslinked rubber 10 by rotation of the screw 15 in the twin-screw extruder 1. By suitably selecting the rotation speed of the screw 15 or the shape thereof, shear stress etc. can be regulated.

Now, the reclaiming method using the twin-screw extruder 1 is described in more detail.

As shown in FIG. 1, the crushed crosslinked rubber 10 is fed through the inlet 110. The inside of cylinder 11 is heated up to a suitable temperature, and the fed crosslinked rubber 10 given shear stress by rotation of the screw 15 is gradually transferred by extrusion to the extrusion orifice 14. The crosslinked rubber 10 is gradually heated in the course of transfer. This is a preheating step, and the region indicated by number 16 in FIG. 1 serves as a preheating zone where the preheating step is performed.

There is a case where the boundary between the preheating zone 16 and a plasticizing zone 17 described below cannot be clearly distinguished.

As the crosslinked rubber 10 advances in the cylinder 11, the temperature of the crosslinked rubber 10 is gradually increased. When a predetermined temperature is attained, cleavage of crosslinkages in the crosslinked rubber 10 is initiated. This is a plasticizing step, and the region indicated by number 17 in FIG. 1 is a plasticizing zone where the plasticizing step is performed.

The plasticized crosslinked rubber 10 further advances while being given shear stress, whereby the crosslinkages in the crosslinked rubber 10 are sufficiently cleaved, and the rubber polymers are dispersed and mixed to form reclaimed rubber 101. This is a kneading step, and the region indicated by number 18 in FIG. 1 serves as a kneading zone where the kneading step is performed.

Then, water 191 from pump 19 is introduced as a degasification carrier into the kneading zone 18. In the kneading step, water 191 is gasified into water vapor 192, and together with decomposed products in the crosslinked rubber 10, is discharged to the outside through the degasification vent 190.

Finally, plasticization sufficiently proceeds whereby the reclaimed rubber 101 almost free of decomposed products is extruded through the extrusion orifice 14.

Now, the test of reclaiming various kinds of crosslinked rubber according to the reclaiming method in this embodiment is described by comparison with the conventional method.

Various kinds of crosslinked rubber and reclamation conditions used are shown in Table 1.

In the table, "NR/SBR=7/3" refers to blended rubber consisting of natural rubber and styrene-butadiene rubber in a ratio of 7:3 by weight. "NR/SBR=3/7" is also defined in the same way. NBR refers to acrylonitrile-butadiene rubber.

Such crosslinked rubbers of Samples 1 to 6 were crushed into pieces of 10 mm or less in size and introduced into a twin-screw extruder having a screw diameter of 30 mm and a screw length of 1200 mm as shown in FIG. 1.

The rotation speed of the screw during reclamation, the temperature of the material in the plasticizing zone where the plasticizing step is conducted during reclamation, and the shear stress in the plasticizing step are shown in Table 1. The throughput in the table refers to the weight of crosslinked rubber introduced into the cylinder per hour.

The crosslinked rubber was reclaimed under suitably altered conditions of degasification as shown in Tables 2 and 3. In the conditions of degasification shown in Tables 2 and 3, "no degasification" means that reclamation was conducted during which the pump 19 was stopped and the degasification vent 190 was opened in the twin-screw extruder 1 shown in FIG. 1. In this test, reclaimed rubber obtained under the conditions of "no degasification" was used as a standard for comparison.

In the table, "degasification under reduced pressure" means that reclamation was conducted under reduced pressure through the degasification vent at a degree of vacuum of 20 Torr in a gauge. No degasification carrier was used.

In the table, "water injection" means that water 191 was injected by pump 19 (volume of water injected into crosslinked rubber: 5 wt-%). The degasification vent was opened for reclamation. Because the degasification vent was open but not under reduced pressure, the injected water was gasified in the cylinder but hardly discharged to the outside.

In the table, "water injection and degasification" means that after water 191 was injected by pump 19 (volume of water injected into crosslinked rubber: 5 wt-%), reclamation was conducted under reduced pressure through the degasification vent at a degree of vacuum of 20 Torr. Accordingly, the introduced water 191 was gasified into water vapor in the cylinder, and discharged through the degasification vent to the outside.

In the table, "heating degasification 160° C. 2 hours" and "heating degasification 200° C. 2 hours" mean that reclaimed rubber obtained under the conditions without degasification was left for 2 hours in a hot-air oven at 160° C. or 200° C., respectively.

The states of each of the resultant reclaimed rubbers were observed. The results are shown in Tables 2 and 3.

Any reclaimed rubbers obtained without degasification had a very strong smell, and when these reclaimed rubbers were re-crosslinked into reclaimed rubber moldings, the working environment in the re-crosslinking step was significantly worsened by smell. It was also found that because the resultant reclaimed rubber moldings also had a very strong smell, their use was limited.

The reclaimed rubbers obtained by degasification under reduced pressure were excellent in outward appearance, and their smell was lower than that of the reclaimed rubbers obtained under the conditions without degasification.

However, these reclaimed rubbers could not be practically used because their smell was not significantly lowered.

The reclaimed rubbers obtained under the condition of the water injection were excellent in outward appearance. However, they could hardly be practically used because their smell was almost the same as that of the rubbers obtained without degasification.

The reclaimed rubbers obtained under the condition of the water injection and degasification were excellent in outward appearance, and their smell was significantly lower than that of the rubbers obtained without degasification. When these reclaimed rubbers were re-crosslinked into reclaimed rubber moldings, there was no smell during the re-crosslinking step, and the resultant reclaimed rubber moldings had little or no smell (see Embodiment 2 below).

When heating degasification was applied, the smell was reduced, but thermally labile rubbers such as Samples 2, 4, 5 and 6 were oxidatively deteriorated so that their surface turned rigid and brittle. If the reclaimed rubbers deteriorated to such an extent were re-crosslinked, the resultant moldings of reclaimed rubber were poor in surface qualities and physical characteristics, and thus hardly practically usable.

As can be seen from the foregoing results, according to the reclamation method of the embodiment, water as the degasification carrier can remove a bad smell, that is, decomposition products generated during reclamation of crosslinked rubber. Accordingly, the problem of smell can be prevented.

According to this embodiment, there can be provided a method of reclaiming crosslinked rubber whose qualities are hardly deteriorated by generation of decomposed products.

TABLE 1

| No. | Type | Material | Screw Rotation Speed (rpm) | Material Temperature (° C.) | Feed Rate (kg/h) | Shear Stress (kg/cm$^2$) |
| --- | --- | --- | --- | --- | --- | --- |
| Sample 1 | Glass run wastes | Solid EPDM | 300 | 300 | 10 | 30 |
| Sample 2 | Weatherstrip wastes | Sponge EPDM | 300 | 300 | 10 | 30 |
| Sample 3 | Bladder wastes | Resin-crosslinked butyl rubber | 300 | 280 | 10 | 30 |
| Sample 4 | Large-tire wastes | NR/SBR = 7/3 | 200 | 200 | 10 | 20 |
| Sample 5 | Automobile tire wastes | NR/SBR = 3/7 | 400 | 220 | 10 | 40 |
| Sample 6 | Carpet backing wastes | NBR | 500 | 230 | 10 | 50 |

TABLE 2

| No. | No degasification | Degasification under reduced pressure | | Water injection | | Water injection and degasification | |
| --- | --- | --- | --- | --- | --- | --- | --- |
| | | Outward appearance | Bad smell | Outward appearance | Bad smell | Outward appearance | Bad smell |
| Sample 1 | Comparative standard | Excellent | lowered a little | Excellent | slightly lowered | Excellent | significantly lowered |
| Sample 2 | Comparative standard | Excellent | lowered a little | Excellent | slightly lowered | Excellent | significantly lowered |
| Sample 3 | Comparative standard | Excellent | lowered a little | Excellent | slightly lowered | Excellent | significantly lowered |
| Sample 4 | Comparative standard | Excellent | lowered a little | Excellent | slightly lowered | Excellent | significantly lowered |
| Sample 5 | Comparative standard | Excellent | lowered a little | Excellent | slightly lowered | Excellent | significantly lowered |
| Sample 6 | Comparative standard | Excellent | lowered a little | Excellent | slightly lowered | Excellent | significantly lowered |

TABLE 3

| No. | Heating degasification (160° C. • 2 hours) | | Heating degasification (200° C. • 2 hours) | |
| --- | --- | --- | --- | --- |
| | Outward appearance | Bad smell | Outward appearance | Bad smell |
| Sample 1 | excellent | slightly lowered | excellent | lowered a little |
| Sample 2 | oxidative deterioration | slightly lowered | oxidative deterioration | lowered a little |
| Sample 3 | excellent | slightly lowered | excellent | lowered a little |
| Sample 4 | oxidative deterioration | slightly lowered | oxidative deterioration | lowered a little |
| Sample 5 | oxidative deterioration | slightly lowered | oxidative deterioration | lowered a little |
| Sample 6 | oxidative deterioration | slightly lowered | oxidative deterioration | lowered a little |

Embodiment 2

In this embodiment, the reclaimed rubbers obtained from Sample 1 in Embodiment 1 by no degasification, water injection and degasification, and heating degasification respectively were compared by examining their performance.

Each reclaimed rubber was heated at 200° C. for 30 minutes, and the generated gas was analyzed by gas chromatography-mass analyzer. The oil content in the rubber was subtracted from the measured gas content. The results are shown in Table 4.

In the table, the number of peaks is the number of generation of detected components, and the total area of detected peaks indicates the amount of detected gas. It is estimated that a smaller value indicates a smaller amount of gas generated from the reclaimed rubber. In other words, a smaller value indicates a smaller amount of malodorous gas contained in the reclaimed rubber, so that reclaimed rubber moldings with less smell and less deterioration in the working environment can be obtained.

As can be seen from the table, the reclaimed rubber obtained by water injection and degasification according to the present invention indicates the smallest value. It was also found that heating degasification could remove a considerable amount of malodorous gas. However, heating degasification for a prolonged period of time is not practical because the surface of thermally labile rubber is oxidized as shown in Embodiment 1.

From these measurement results, it was found that the bad smell can be significantly decreased by reducing the number of peaks upon heating at 200° C. for 30 minutes or the total area of detected peaks to ½.

TABLE 4

| | Number of peaks | Total area of detected peaks |
| --- | --- | --- |
| No degasification | 209 | 118.6 |
| Water injection and degasification | 129 | 54.7 |
| Heating degasification (200° C., 0.5 hour) | 165 | 77.4 |
| Heating degasification (200° C., 1 hour) | 176 | 78.3 |
| Heating degasification (200° C., 2 hours) | 154 | 62.7 |
| Heating degasification (200° C., 4 hours) | 155 | 64.8 |

Embodiment 3

In this embodiment, the crosslinked rubbers (Samples 1, 2 and 4) in Embodiment 1 were reclaimed according to the method in Embodiment 1, and the resultant reclaimed rubbers were crosslinked to produce reclaimed rubber moldings, which were then examined for their performance.

As shown in Table 5, the crosslinking agents were added to the resultant reclaimed rubbers, and under the conditions shown in the table below, the reclaimed rubber from Sample 1 was crosslinked singly, and the reclaimed rubbers from Samples 2 and 4 were crosslinked after being mixed with new non-crosslinked rubber in ratios of 5:5 and 2:8 by weight respectively.

These reclaimed rubbers were obtained by no degasification, water injection and degasification, and heating degasification, respectively.

The vulcanization characteristics of these reclaimed rubbers were measured by a Mooney viscometer and a curemeter according to JIS K-6300. The results are shown in Table 6.

The resultant moldings of reclaimed rubber were measured for tensile strength at break and tensile elongation at break according to JIS K-6301.

The generation of bad smell in the process of producing the reclaimed rubbers was evaluated by total points in organoleptic evaluation made by 10 operators.

The criteria of the organoleptic evaluation are as follows:
Point 5: Unpleasant smell under which the operation is difficult even in a short time.
Point 4: Unpleasant smell under which the operation is feasible in a short time.
Point 3: Unpleasant smell under which the operation is feasible for a long time.
Point 2: Unpleasant smell under which the operation is not influenced.
Point 1: A smell which is not unpleasant is felt.
Point 0: No smell is felt.

The sum of these points is total points in the organoleptic evaluation, and shown in Table 6.

Further, the smell of the resultant reclaimed rubber moldings was subjected to organoleptic evaluation.

As can be seen from Table 5, the bad smell during the operation and the bad smell of the reclaimed rubber moldings can be improved by water injection and degasification. It was also found that water injection and degasification does not adversely affect vulcanization characteristics and mechanical characteristics, while heating degasification adversely affects the vulcanization characteristics and mechanical characteristics of thermally easily deteriorated sponge EPDM and large tires.

TABLE 5

| No. | Type | Materials | Amount of cross-linking agents added to 100 parts by weight of rubber components (parts by weight) | Amount of reclaimed rubber added (parts by weight) | Crosslinking conditions |
| --- | --- | --- | --- | --- | --- |
| Sample 1 | Glass run wastes | Solid EPDM | Sulfur (0.8), Zinc oxide (1.7), Stearic acid (0.3), Nocceler TT (0.67), Nocceler M (0.17) | 100 | 160° C., 20 min. |
| Sample 2 | Weatherstrip wastes | Sponge EPDM | Sulfur (0.8), Zinc oxide (1.7), Stearic acid (0.3), Nocceler TT (0.67), Nocceler M (0.17) | 50 | 160° C., 20 min. |
| Sample 4 | Large-tire wastes | NR/SBR = 7/3 | Sulfur (3), Zinc oxide (5), Stearic acid (1), Nocceler CZ-G (1.0) | 20 | 141° C., 20 min. |

"Nocceler" is a trade name of a product of Ouchishinko Chemical Industrial Co., Ltd.

TABLE 6

| No. | | Mooney viscosity (ML 1 + 4, 100° C.) | Curemeter; T10/T90 (min) | Tensile strength at break (MPa) | Tensile elongation at break (%) | Organoleptic evaluation of bad smell during the process (total points) | Bad smell of re-vulcanized product |
| --- | --- | --- | --- | --- | --- | --- | --- |
| Sample 1 | No degasification | 65 | 1.95/6.35 (170° C.) | 13.5 | 470 | 40 | Present |
| | Water injection and degasification | 63 | 2.03/5.53 (170° C.) | 13.3 | 490 | 16 | Absent |
| | Heating degasification (200° C., 2 hours) | 60 | 1.62/6.24 (170° C.) | 13 | 450 | 24 | Absent |
| Sample 2 | No degasification | 52 | 0.58/2.63 (170° C.) | 8.52 | 320 | Not measured | Present |
| | Water injection and degasification | 53 | 0.52/2.54 (170° C.) | 8.72 | 350 | | Absent |
| | Heating degasification (200° C., 2 hours) | 70 | 0.87/4.65 (170° C.) | 6.58 | 250 | | Absent |
| Sample 4 | No degasification | 55 | 1.85/9.52 (150° C.) | 19.5 | 450 | | Present |
| | Water injection | 52 | 1.73/9.76 | 19.1 | 480 | | Absent |

TABLE 6-continued

| No. | Mooney viscosity (ML 1 + 4, 100° C.) | Curemeter; T10/T90 (min) | Tensile strength at break (MPa) | Tensile elongation at break (%) | Organoleptic evaluation of bad smell during the process (total points) | Bad smell of re-vulcanized product |
|---|---|---|---|---|---|---|
| and degasification | | (150° C.) | | | | |
| Heating degasification (200° C., 2 hours) | 48 | 2.14/11.83 (150° C.) | 17.3 | 350 | | Absent |

Embodiment 4

A method of reclaiming vulcanized EPDM and simultaneously blending it with PP resin is described in this embodiment.

First, the extruder used in this embodiment is described.

Figure 2:
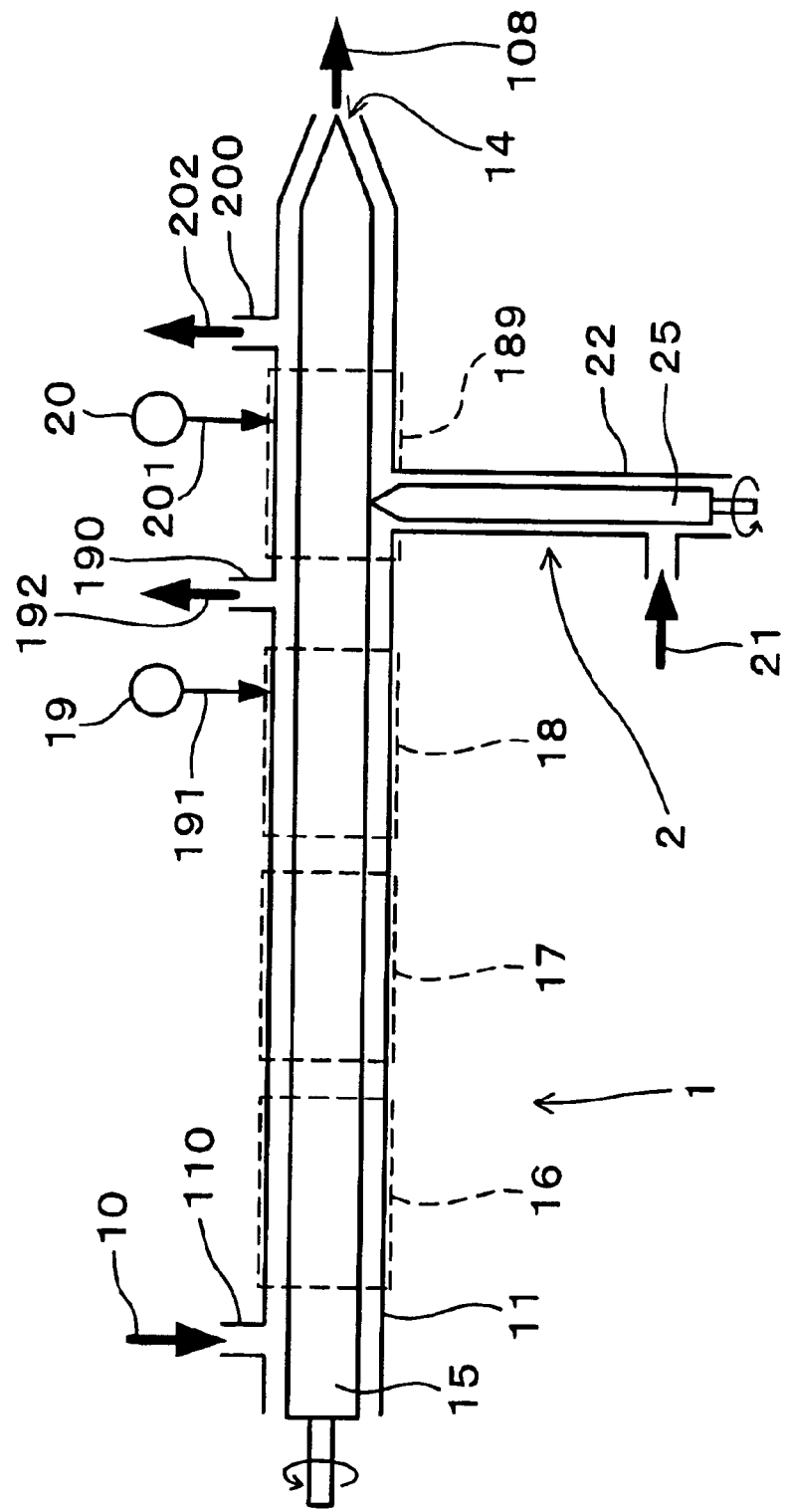
FIG. 2 shows the structure of a twin-screw extruder used in reclamation of crosslinked rubber in Embodiment 4.

As shown in FIG. 2, the twin-screw extruder 1 includes cylinder 11 and side-feeder 2 arranged on the cylinder 11, and the side-feeder 2 includes sub-cylinder 22 and screw 25.

The side-feeder 2 is arranged between the pump 19 or degasification vent 190 and the extrusion orifice 14. Pump 20 and degasification vent 200 are arranged between the side-feeder 2 and the extrusion orifice 14.

Now, the reclaiming method is described in detail.

Scrap of sulfur-crosslinked EPDM rubber containing 50% by weight of carbon black was crushed into about 10 mm cubic pieces. These were used as the crosslinked rubber 10 in this embodiment.

Separately, pellets of PP resin (polypropylene resin) were prepared.

The crosslinked rubber 10 is fed into the inlet 110 of the twin-screw extruder 1.

The inside of the cylinder 11 is heated up to 300° C., and by screw 15, the fed crosslinked rubber 10 is gradually extruded toward the extrusion orifice 14 to be heated. This is a preheating step which is performed in a preheating zone 16.

The screw rotation speed 15 is 400 rpm. The reclamation throughput is 5 kg/h.

As the crosslinked rubber 10 advances in the cylinder 11, the temperature of the crosslinked rubber 10 is gradually increased. When a predetermined temperature is attained, cleavage of crosslinkages in the rubber is initiated. This is a plasticizing step which is performed in a plasticizing zone 17.

The plasticized crosslinked rubber 10 advances further toward the extrusion orifice and formed into reclaimed rubber by shear stress. This is a kneading step which is performed in a kneading zone 18.

Then, water 191 is introduced as a degasification carrier from pump 19 into the kneading zone 18. In the kneading step, water 191 is gasified into water vapor 192, and together with decomposed products in the crosslinked rubber 10, is discharged to the outside through the degasification vent 190.

Simultaneously with the above process, PP resin 21 is fed into the side-feeder 2. By screw 25 in the cylinder 22, PP resin 21 is introduced into a zone following the kneading zone 18 in cylinder 11, and then subjected to plasticization.

Then, the reclaimed rubber formed from the crosslinked rubber 10 and PP resin 21 are melted and kneaded by screw 15. This melting and kneading step is conducted in the blending zone indicated by number 189. After PP resin 21 is added, the temperature (of the blending zone 189) is kept at 230° C.

Water 201 is introduced as a degasification carrier from pump 201 into the blending zone 189. In the blending zone 189, water 201 is gasified into water vapor 202, and together with various decomposed products, discharged through the degasification vent 200 to the outside.

Finally, the reclaimed rubber/PP blend 108, which is a plasticized mixture of the reclaimed rubber and PP resin, is extruded from the extrusion orifice 14.

The amounts of crushed vulcanized EPDM and PP resin introduced in the reclaiming method in this embodiment are shown in Table 7.

The amount of water added by pump 19 was 5 wt % relative to the vulcanized EPDM, the amount of water added by pump 20 was 5 wt % relative to the vulcanized EPDM/PP resin blend, degasification was conducted using degasification under reduced pressure, and a pressure in a gauge was 20 Torr.

The reclaimed rubber/PP blend 108 was evaluated for its smell during and after reclamation. The smell of the reclaimed rubber/PP blend is shown by comparison with that of a reclaimed rubber/PP blend obtained by the reclaiming method without degasification. The criteria for evaluation of smell during the process are the same as in Embodiment 3.

The results are shown in Table 7.

As can be seen from Table 7, the smell can be significantly reduced by using water as the degasification carrier in the present invention.

TABLE 7

| Vulcanized EPDM (parts by weight) | PP resin (parts by weight) | Degasification | Organoleptic evaluation of smell during the process (total points) | Smell of reclaimed rubber/PP blend |
|---|---|---|---|---|
| 30 | 70 | water injection and degasification | 16 | significantly reduced |
| 30 | 70 | no degasification | 40 | present |
| 80 | 20 | water injection and degasification | 16 | significantly reduced |
| 80 | 20 | no degasification | 40 | present |

A method of reclaiming vulcanized EPDM and simultaneously blending it with PP resin is described in this embodiment similar to Embodiment 4.

For reclamation in this embodiment, however, a deodorant was introduced together with PP resin into the twin-screw extruder. The ratio of vulcanized EPDM/PP resin blend was 80/20 parts by weight.

Whether the deodorant was added or not and the type of the deodorant are shown in Table 8. For comparison, a blend reclaimed by the reclaiming method without degasification was examined for its smell.

The smell in the reclaiming and blending steps and the smell of the reclaimed rubber/PP blend were evaluated.

The smells of the reclaimed rubber/PP blends obtained in the presence or absence of the deodorant were compared. The criteria for evaluation of smell are the same as in Embodiment 3.

The results are shown in Table 8.

As can be seen from this table, the unpleasant smell in the reclaiming step and the unpleasant smell in the reclaimed product can be further suppressed by conducting water injection and degasification and by adding the deodorant.

TABLE 8

| Degasification method | Deodorant Type | Amount | Bad smell during the process | Bad smell |
|---|---|---|---|---|
| None | — | — | standard | standard |
| None | vanillin | 0.5 wt % | no effect | no effect |
| None | lignin | 0.5 wt % | no effect | no effect |
| Water injection and degasification | — | — | significantly lowered | significantly lowered |
| Water injection and degasification | vanillin | 0.5 wt % | no unpleasant smell | no unpleasant smell |
| Water injection and degasification | lignin | 0.5 wt % | no unpleasant smell | no unpleasant smell |

Embodiment 6

In this embodiment, crosslinked rubber was reclaimed where the positions of pumps for injecting water as the degasification carrier and the positions of degasification vents were changed.

Sample 1 in Embodiment 1 was used as the crosslinked rubber in this embodiment.

The crosslinked rubber was reclaimed under the conditions that the pumps and degasification vents are in the states shown in Table 9. The smell of the resultant rubber was evaluated.

As can be seen from Table 9, the smells of the reclaimed rubbers obtained under conditions 2 to 4 were lower than the smell of the reclaimed rubber obtained under condition 1 (=standard condition under which degasification by the degasification carrier was not conducted). In particular, the smell was significantly lower under condition 4.

Under conditions 5 and 7, water was injected to the plasticizing zone, followed by degasification through vents arranged on the plasticizing and kneading zones. Under condition 5, the smell of the reclaimed rubber was lowered, but the effect was not so high. On the other hand, it was recognized under condition 7 that the smell was lowered.

Under condition 6, water was injected to the preheating zone, followed by degasification. However, the crosslinked rubber was still not plasticized in the preheating zone, and as a consequence, decomposed products were not generated. Accordingly, it was found that the effect of the degasification carrier in the present invention could hardly be obtained.

TABLE 9

| | P1 | P2 | P3 | V1 | V2 | V3 | Bad smell |
|---|---|---|---|---|---|---|---|
| Condition 1 | no injection | no injection | no injection | closed | closed | open | standard |
| Condition 2 | no injection | no injection | water (0.01 wt %) | closed | closed | degasification under reduced pressure | lowered a little |
| Condition 3 | no injection | no injection | water (0.5 wt %) | closed | closed | degasification under reduced pressure | lowered |
| Condition 4 | no injection | no injection | water (5.0 wt %) | closed | closed | degasification under reduced pressure | significantly lowered |
| Condition 5 | no injection | water (5.0 wt %) | no injection | closed | degasification under reduced pressure | closed | lowered |
| Condition 6 | water (5.0 wt %) | no injection | no injection | degasification under reduced pressure | closed | closed | similar to 1 |
| Condition 7 | no injection | water (5.0 wt %) | no injection | closed | closed | degasification under reduced pressure | significantly lowered |

Figure 3:
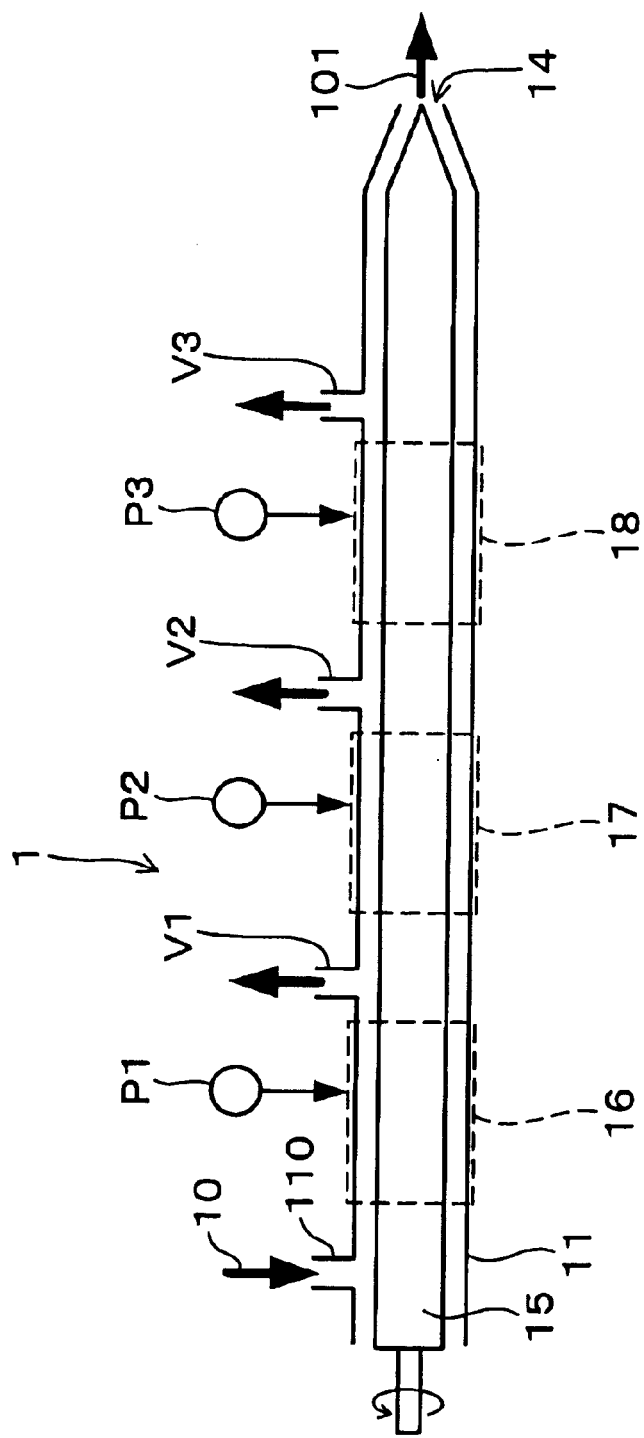
FIG. 3 shows the structure of a twin-screw extruder used in reclamation of crosslinked rubber in Embodiment 6.

As shown in FIG. 3, the twin-screw extruder 1 similar to that in Embodiment 1 is provided with pumps P1 to P3 and degasification vents V1 to V3. These pumps and degasification vents are arranged to correspond to a preheating zone, a plasticizing zone and a kneading zone in the cylinder, respectively.

Embodiment 7

In this embodiment, the resin-crosslinked butyl rubber as Sample 3 in Embodiment 1 was reclaimed by the method in Embodiment 1, and the resultant reclaimed rubber was crosslinked to produce a reclaimed rubber molding which was then evaluated for its performance.

30 parts by weight of the resultant reclaimed rubber was mixed with 70 parts by weight of new non-crosslinked butyl rubber. 2.0 parts by weight of sulfur, 5.0 parts by weight of zinc oxide, 1.0 part by weight of TMTD and 0.5 part by weight of MBT were added to 100 parts by weight of the resulting rubber mixture.

As the reclaimed rubber, two kinds of reclaimed rubbers obtained without degasification and by water injection and degasification were used respectively.

The reclaimed rubbers were measured for vulcanization characteristics by a Mooney viscosity and a curemeter according to JIS K-6300. The results are shown in Table 10.

Moldings obtained from these reclaimed rubber were measured for tensile strength at break and tensile elongation at break according to JIS K-6301. The results are shown in Table 10.

The amounts of impurities therein were determined by gas chromatography-mass analysis in the same manner as in Embodiment 2. The results are shown in Table 10.

From Table 10, it was found that because the time of T10 for the product obtained without degasification, as determined by a curemeter, is shorter, scorch is generated. It was also found that the product has scorch and thus has a problem with storage stability, and production of large moldings is difficult.

It was also found that the product obtained by water injection and degasification is free of scorch and is excellent in storage stability and in processability in forming large moldings.

From the amount of impurities in Table 10, it was found that the total area for impurities in the product obtained by water injection and degasification is ½ or less relative to that without degasification, thus indicating a reduction in various decomposed products adversely affecting vulcanization characteristics, and scorch can thereby be prevented.

TABLE 10

| | Mooney viscosity (ML1 + 4, 100° C.) | Curemeter; T10/T90 (min) | Tensile strength at break (MPa) | Tensile elongation at break (%) | Amount of impurities (*) |
|---|---|---|---|---|---|
| No degasification | 60 | 0.8/43.5 (160° C.) | 7.3 | 320 | 158/180.3 |
| Water injection and degasification | 60 | 3.5/35.3 (160° C.) | 9.2 | 470 | 123/83.7 |

(*) Number of peaks/total area (GC-MS analysis)

Embodiment 8

Figure 4:
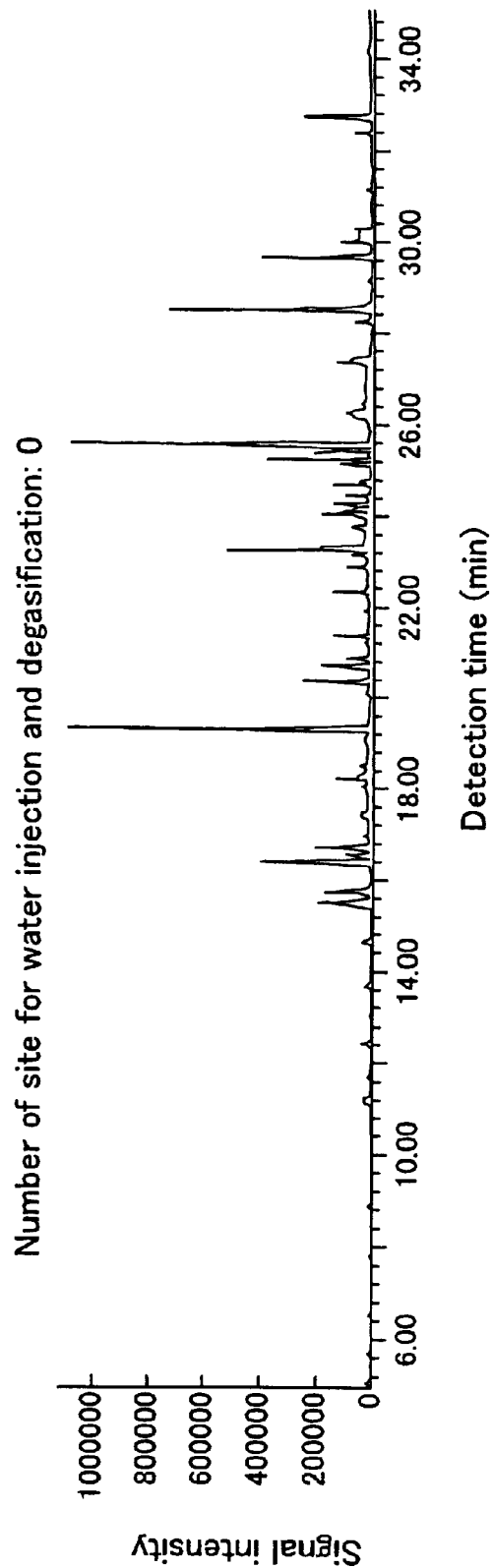
FIG. 4 is a chart showing the result of gas chromatography-mass analysis of a malodorous gas in reclaimed materials produced in Embodiment 8, wherein the number of sites for injection and degasification in an extruder is 0.
Figure 5:
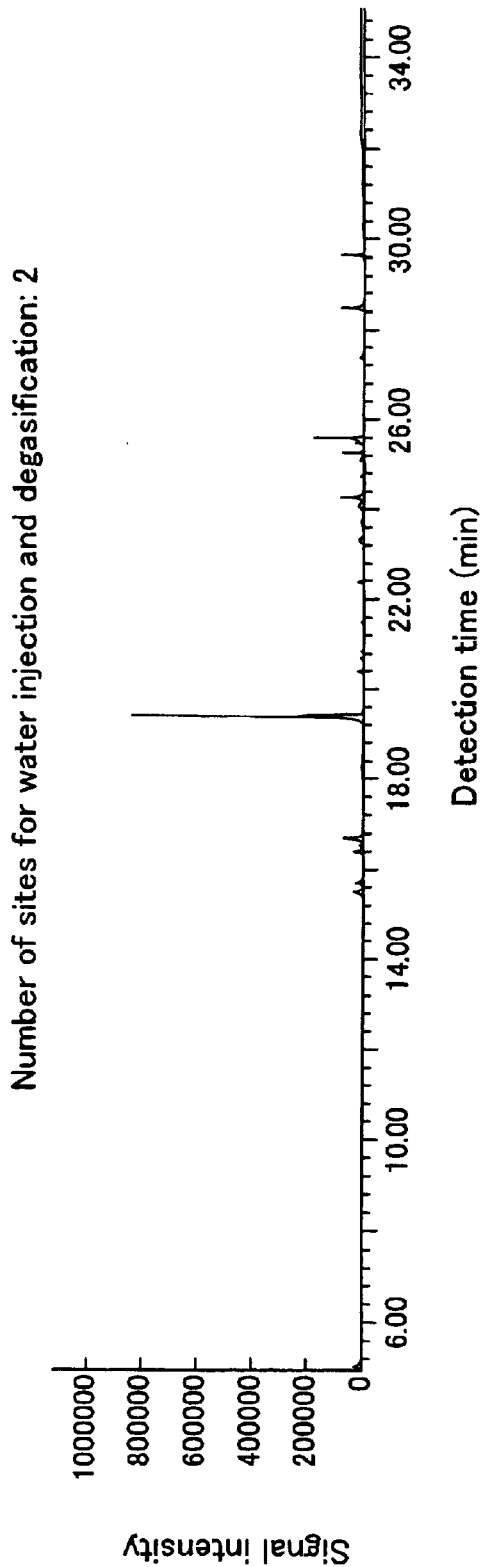
FIG. 5 is a chart showing the result of gas chromatography-mass analysis of a malodorous gas in reclaimed materials produced in Embodiment 8, wherein the number of sites for injection and degasification in an extruder is 2.

In this embodiment, Sample 1 was treated to prepare reclaimed materials of solid EPDM in the same manner as in Embodiment 1 except that the number of sites for water injection and degasification in the extruder used in Embodiment 1 was 0 or 2 (1 in the plasticizing zone and 1 in the kneading zone). The respective reclaimed materials were heated at 100° C. for 5 minutes, and the generated gas was analyzed by gas chromatography-mass analyzer. The evaluation results are shown in FIG. 4, FIG. 5 and Table 1. FIG. 4 shows a chart of the sample obtained in the extruder where the number of sites for water injection and degasification was 0, and FIG. 5 shows a chart of the sample obtained in the extruder where the number of sites for water injection and degasification was 2.

In FIGS. 4 and 5, the detection time (min) is shown on the abscissa and the signal intensity on the ordinate. In FIG. 11, the number of peaks is the number of generation of detected components, and the total area of detected peaks indicates the amount of detected gas.

From the figures and the table, it was found that decomposed products such as malodorous components can be significantly reduced by water injection and degasification.

TABLE 11

| Number of sites for degasification | Number of peaks | Total area of detected peaks |
|---|---|---|
| 0 (no degasification) | 24 | 197.4 |
| 2 | 7 | 35.0 |

Embodiment 9

In this embodiment, the number of sites for water injection and degasification in the extruder used in Embodiment 1 was 0 to 3. Specifically, the number of sites in the plasticizing zone was 1 and the number of sites in the kneading zone was 2, and the number was changed as necessary by switching between actuation and in actuation. Other conditions were in accordance with those in Embodiment 1, and Sample 4 of large-tire wastes was treated to prepare reclaimed materials.

Figure 6:
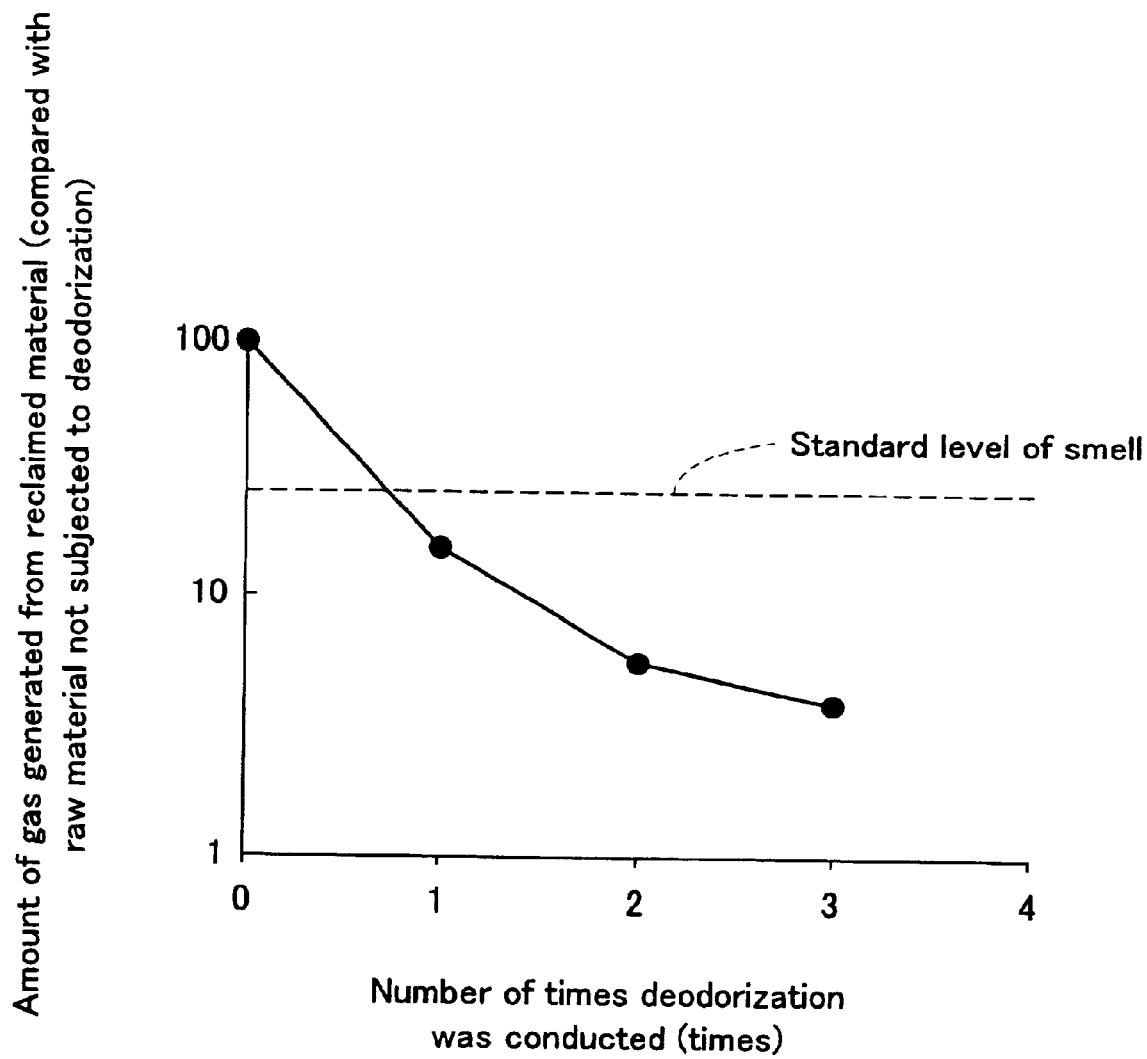
FIG. 6 is a graph showing the correlation between the number of times of deodorization and the amount of generated gas in Embodiment 9.

The respective reclaimed materials were heated at 130° C. for 30 minutes, and the generated gas was analyzed by gas chromatography-mass analyzer. The evaluation results are shown in FIG. 6. In FIG. 6, the result of analysis of the raw materials before reclamation (large-tire wastes) is indicated as the standard level of smell. In FIG. 6, the number of times of deodorization was conducted (that is, the number of actuated sites for water injection and degasification) is shown on the abscissa, and the amount of defected gas relative to the amount (=100%) of gas generated from the raw materials which is not subjected to deodorization is shown on the ordinate.

As can be seen from FIG. 6, decomposed products such as malodorus components can be significantly reduced by water injection and degasification, whereby the level of smell is lower below the level of smell in the raw materials.

What is claimed is:

1. A method of reclaiming crosslinked rubber, comprising:
   introducing a degasification carrier and removing, together with the degasification carrier, decomposed products in crosslinked rubber by applying shear stress thereto, during 1) a reclamation step of reclaiming crosslinked rubber and/or 2) a subsequent step after the reclamation step.

2. The method of reclaiming crosslinked rubber according to claim 1, wherein the crosslinked rubber is resin-crosslinked butyl rubber.

3. The method of reclaiming crosslinked rubber according to claim 1, wherein the degasification carrier is at least one member selected from the group consisting of inert gas, water and alcohol.

4. The method of reclaiming crosslinked rubber according to claim 1, wherein the reclamation step is conducted at the temperature of 100 to 520° C.

5. A molding of reclaimed rubber, produced by a process which comprises
   introducing a degasification carrier and removing, together with the degasification carrier, decomposed products in crosslinked rubber by applying shear stress thereto during 1) a reclamation step of reclaiming crosslinked rubber and/or 2) a subsequent step after the reclamation step, to obtain reclaimed rubber, and
   re-crosslinking the reclaimed rubber or melt-blending the reclaimed rubber with thermoplastic resin, to obtain a molded reclaimed rubber.

6. The molding of reclaimed rubber according to claim 5, wherein the crosslinked rubber is resin-crosslinked butyl rubber.

7. The molding of reclaimed rubber according to claim 5, wherein the amount of decomposed products in the reclaimed rubber is reduced to ½ or less relative to the amount of decomposed products in the reclaimed rubber before introduction of the degasification carrier.

8. The method according to claim 1, wherein the degasification carrier is introduced after the decomposed products have been generated.

9. The method according to claim 1, wherein the crosslinked rubber is selected from the group consisting of sulfur-vulcanized ethylene propylene diene terpolymer, a blend of natural rubber and styrene-butadiene rubber, styrene-butadiene rubber, and acrylonitrile-butadiene rubber.

10. The method according to claim 1, wherein an amount of the degasification carrier is 0.02 to 20 parts by weight based on 100 parts by weight of crosslinked rubber.

11. The method according to claim 1, wherein an amount of the degasification carrier is 0.5 to 7 parts by weight based on 100 parts by weight of crosslinked rubber.

12. The method according to claim 1, wherein the decomposed products and the degasification carrier are removed by heating degasification, degasification under reduced pressure, solvent cleaning, or bubbling.

13. The method according to claim 1, wherein the reclamation steps comprises a preheating step, a plasticizing step and a kneading step.

14. The method according to claim 1, wherein the shear stress is 1 to 100 MPa.

15. The method according to claim 1, wherein the shear stress is 1 to 15 MPa.

16. The method according to claim 1, wherein the reclaiming is performed in an extruder.

17. The method according to claim 3, wherein the inert gas is $N_2$, Ar, He or $CO_2$.

18. A method of reclaiming crosslinked rubber, comprising:

introducing water as a degasification carrier and removing, together with the degasification carrier, decomposed products in crosslinked rubber by applying shear stress thereto, during 1) a reclamation step of reclaiming crosslinked rubber and/or 2) a subsequent step after the reclamation step.

* * * * *